(12) United States Patent
Man

(10) Patent No.: US 8,202,187 B2
(45) Date of Patent: Jun. 19, 2012

(54) CRANK-CVT TRANSMISSION

(75) Inventor: Laszlo Man, Ottersweier-Unzhurst (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/070,759

(22) Filed: Mar. 24, 2011

(65) Prior Publication Data

US 2011/0172052 A1 Jul. 14, 2011

Related U.S. Application Data

(63) Continuation of application No. PCT/DE2009/001311, filed on Sep. 17, 2009.

(30) Foreign Application Priority Data

Oct. 2, 2008 (DE) .......................... 10 2008 050 282

(51) Int. Cl.
*F16H 48/06* (2006.01)
(52) U.S. Cl. .......................................... 475/221; 475/7
(58) Field of Classification Search .................... 74/371, 74/372; 475/230, 206, 7, 221
See application file for complete search history.

(56) References Cited

U.S. PATENT DOCUMENTS

| | | | | |
|---|---|---|---|---|
| 5,400,671 | A * | 3/1995 | Hall et al. | 74/371 |
| 5,992,254 | A * | 11/1999 | Machado | 74/372 |
| 6,698,303 | B2 * | 3/2004 | Hoffmann et al. | 74/337.5 |
| 6,978,692 | B2 * | 12/2005 | Thery | 74/372 |
| 7,882,758 | B2 * | 2/2011 | Kubo et al. | 74/372 |
| 7,997,159 | B2 * | 8/2011 | Hemphill et al. | 475/298 |
| 2004/0050197 | A1 * | 3/2004 | Thery | 74/371 |

FOREIGN PATENT DOCUMENTS

| | | |
|---|---|---|
| DE | 102 43 533 A1 | 4/2003 |
| DE | 10 2005 048 611 A1 | 4/2006 |
| WO | 90/14530 A | 11/1990 |
| WO | 94/01698 A | 1/1994 |

\* cited by examiner

*Primary Examiner* — David D Le
*Assistant Examiner* — Derek D Knight
(74) *Attorney, Agent, or Firm* — Lucas & Mercanti, LLP; Klaus P. Stoffel

(57) ABSTRACT

A crank-CVT transmission which has a freewheel device connected to an output shaft of the transmission. The device selectively enables and blocks a relative rotation between the device and the output shaft. The transmission further has a switching unit adapted to switch the device and an internal shaft, which can be connected to the output shaft and by a connecting element to a differential. The internal shaft can be displaced in the axial direction of the output shaft. The transmission further has an actuator interacting with the switching unit and adapted to initiate the switch of the device. The actuator has a first mechanism adapted to displace the internal shaft in the axial direction, disconnecting the internal shaft from the differential a second mechanism adapted to drive the switching unit. The second mechanism is coupled to the first mechanism and is driven after the first mechanism.

16 Claims, 10 Drawing Sheets

CRANK-CVT TRANSMISSION

This application is a Continuation of PCT/DE2009/001311 filed Sep. 17, 2009, which in turn claims the priority of DE 10 2008 050 282.0 filed Oct. 2, 2008, the priority of both applications is hereby claimed and both applications are incorporated by reference herein.

FIELD OF THE INVENTION

The present application relates to a crank-CVT transmission. In particular, the invention relates to an actuator which initiates the shifting of freewheels of a crank-CVT transmission.

BACKGROUND OF THE INVENTION

A crank-CVT transmission is known, for example, from DE 102 43 533 A1. This transmission has a driving shaft, for example a transmission input shaft, which can be coupled to an engine, and at least one driven shaft, for example a transmission output shaft, which shafts can have a drive connection to one another. Furthermore, this transmission has a freewheel device. In this context, the freewheel device is composed of a plurality of freewheel units which are arranged axially one behind the other around the driven shaft and which can be shifted. This means that the blocking direction of the clamping bodies with respect to the two rings which can be rotated with respect to one another can be shifted. By using such freewheel units it is easily possible to change the direction of rotation of the shaft in the transmission and therefore implement, for example, a reverse gear speed. Additional direction shifting transmissions, for example planetary gear mechanisms, are not necessary.

In order to shift the blocking function of the freewheel, in DE 102 43 533 A1 a shifting device is provided which has a plurality of shifting units which are each arranged between adjacent clamping bodies. The shifting units can be activated synchronously and have shifting means which each have a rotatable, disk-shaped region and a profiled region, which is preferably composed of a profiled rod. A spring, which is formed by a leg spring, is provided on the profiled region. The spring can be clamped between the profiled region and a clamping body. The profiled rods and the means of activating the shifting can extend axially through all the freewheel units, with the result that when the profiled rods are rotated all the freewheel devices can be shifted at the same time in order to be able to shift the freewheels of a crank-CVT transmission so as to change the direction of travel of a vehicle, the crank-CVT transmission must be load-free. For this reason, the output unit of the crank-CVT transmission must be decoupled from the differential. In previously known crank-CVT transmissions, decoupling or unlocking of the output unit and the activation of the shifting are carried out by means of multi-disk clutches or by means of a plurality of shifting sleeves. In this context, the multi-disk clutches or the shifting sleeves have the function of actuators.

The unlocking or decoupling of the output unit by means of multi-disk clutches or shifting sleeves has the disadvantage that a multiplicity of actuators is often also necessary for a multiplicity of freewheels. A multiplicity of actuators requires a relatively large amount of installation space for the crank-CVT transmission. This means that as the number of actuators increases there is an accompanying increase in the space required in the crank-CVT transmission. In addition, the decoupling process has to be matched chronologically to the shifting process by a suitable controller.

On this basis, the object of the invention is to provide a crank-CVT transmission which has a single actuator for decoupling the drive unit and for initiating the shifting of the freewheel.

SUMMARY OF THE INVENTION

The invention is based on the idea of making available the decoupling of the output unit of a crank-CVT transmission and the initiation of the shifting of the freewheels with a single actuator. In this context, the decoupling of the output unit is carried out by means of a first mechanism, and the initiation of the shifting of the freewheels is carried out by means of a second mechanism, the methods of operation of said mechanisms being matched to one another. In order to decouple the output unit, a connecting means which is arranged on an inner shaft, which is in turn connected to an output shaft and which forms a connecting element between the output unit and the differential, is disconnected from the differential by being moved out of engagement.

In this context, a crank-CVT transmission contains a freewheel device connected to an output shaft of the transmission, which freewheel device is adapted to optionally enable and to block a relative rotation between the freewheel device and the output shaft. Furthermore, the crank-CVT transmission contains a shifting unit which is adapted to shift the freewheel device, and an inner shaft which can be connected to the output shaft, and to a differential via a connecting means. The inner shaft can be displaced in the axial direction of the output shaft. The crank-CVT transmission also has an actuator which interacts with the shifting unit and is adapted to initiate the shifting of the freewheel device. In this context, the actuator has a first mechanism which is adapted to displace the inner shaft in the axial direction in order to disconnect the inner shaft from the differential, and a second mechanism which is adapted to drive the shifting unit. In this context, the second mechanism is coupled to the first mechanism and is driven after the first mechanism in terms of time.

The decoupling of the output unit is preferably carried out by, for example, de-meshing the connecting means using a ramp mechanism. In this context, the ramp mechanism has ramp bodies in the form of halls or rollers. The ramp mechanism is activated by means of a first planetary gear set. The freewheels are shifted by means of two further planetary gear sets.

The three planetary gear sets preferably have a common web and therefore a common planetary gear carrier. The shifting of the freewheels is matched chronologically to the decoupling of the output unit by means of the common planetary gear carrier and a suitable connection between the first and second mechanisms.

This means that in accordance with the basic idea of the invention the shifting process of the freewheels is carried out on the basis of the progress of the decoupling process of the output unit, and is matched thereto. The shifting of the freewheels does not take place until the decoupling of the connecting means is terminated and the output unit is load-free. Incorrect control can be avoided by virtue of the preferably mechanical interaction between the shifting process and the decoupling process. A reliable operational sequence of the crank-CVT transmission which simultaneously requires little installation space is therefore made possible.

The connecting means can preferably correspond to a bevel gear. The shifting unit can be a spindle unit or some other shifting mechanism.

During the relieving of the loading on the drive unit by means of the first mechanism, the drive unit is placed in a load-free state in terms of the coupling to the differential.

According to one preferred embodiment, the first mechanism has a drive. The actuator is driven via the drive.

The drive is advantageously a worm drive or a worm gear.

Furthermore, the first mechanism advantageously has a first hollow gear, a first planetary gear set and a first sun gear. In order to drive the actuator, the worm drive engages in the region on the circumference of the first hollow gear which is correspondingly configured for an intervention by the worm drive.

Planetary gear mechanisms have the advantage of having a characteristic compact design. The advantage of planetary gear mechanisms over other types of transmission is therefore, on the one hand, a compact size with a comparable transmission ratio, and, on the other hand, the possibility of coaxial changes of direction.

The first mechanism preferably also has the ramp mechanism or alternatively some other mechanism which ensures longitudinal displacement of the inner shaft. In this context, the ramp mechanism has a ramp planetary gear set, a first ramp, which is permanently connected to the inner shaft, and a second ramp, which is permanently arranged in a ramp housing. At least one ramp body is arranged between the first ramp and the second ramp, which are arranged following one another in the axial direction of the output unit. The ramp body can be a ball or a roller.

The first mechanism preferably also has a compression spring which is adapted and arranged so as to compress the first ramp and the second ramp. The compression spring applies here a continuous force to the first ramp and the second ramp, and therefore provides the first ramp and the second ramp with a tension which presses the first ramp and the second ramp against one another, and therefore ensures pre-loading into the coupling state.

The advantage of a ramp mechanism with a ramp which can be displaced in the axial direction of the output unit is that from a selective configuration of the ramps, selective and therefore previously accurately determinable axial displacement of the displaceable inner shaft and therefore of the ramp, is also made possible. Controlled de-meshing and meshing of the bevel gear are therefore guaranteed. If the first ramp and the second ramp are clamped against one another in an undeviating fashion by means of a spring, in particular by means of a compression spring, a satisfactory and previously determined movement of the ramp body is therefore brought about.

The first mechanism advantageously has a further spring, in particular a bow spring, which is arranged between the first sun gear and the ramp mechanism.

The advantage of a bow spring between the first sun gear and the ramp mechanism is that the shifting energy of the freewheel shifting is buffered in the bow spring. This is advantageous in particular when the tooth heads of the bevel gear prevent immediate meshing in the differential after shifting. As a result of the use of the bow spring, the bevel gear jumps again into engagement as soon as the vehicle, which has the crank-CVT transmission, approaches slowly, and the first ramp locks the position. The energy which is required for meshing is therefore buffered by the spring.

The second mechanism advantageously has a second hollow gear, a second planetary gear set and a second sun gear.

The second mechanism also advantageously has a third hollow gear, a third planetary gear set and a third sun gear.

It is preferred here if the first sun gear and the third sun gear are mounted rotatably in the output unit, and the second sun gear is permanently connected to the ramp housing. The second sun gear is permanently arranged on the circumference of the ramp housing.

In addition to the advantage of having a compact design, the coaxial change of direction, which is achieved by means of three or more usually coaxially arranged shafts in the planetary gear mechanism, is particularly advantageous. Forces which are applied radially far on the outside to the output unit, in particular to the first hollow gear, can be passed on radially into the interior of the output unit by means of a planetary gear mechanism and/or a plurality of planetary gear mechanisms.

The first planetary gear set of the first mechanism and the second planetary gear set and third planetary gear set of the second mechanism advantageously have a common planetary gear carrier. The planetary gear carrier corresponds to a web on which the first, second and third planetary gear set are arranged.

As a result of the common planetary gear carrier, the shifting process is advantageously linked to the decoupling process. As a result, the shifting of the freewheel device does not take place chronologically until the decoupling of the bevel gear from the differential is terminated. This means that the shifting of the freewheel device does not take place until the bevel gear is decoupled from the differential and the output unit is therefore load-free. This ensures that the freewheel device of the crank-CVT transmission is shifted only when the crank-CVT transmission is load-free.

The second hollow gear of the second mechanism advantageously has, on the surface which is assigned to the first hollow gear, at least one arcuate groove in which a pin, which is permanently connected to the first hollow gear, is arranged. In this context, the at least one groove runs in the radial direction of extent or extension of the second hollow gear. The pin permits a connection of the first gearwheel to the second gearwheel.

The second gearwheel advantageously has, on the surface which is assigned to the first hollow gear, three arcuate grooves in each of which a pin, which is permanently connected to the first hollow gear, is arranged. In this context, the three grooves run in the radial direction of extent or of extension of the second hollow gear. The pins permit a connection of the first hollow gear to the second hollow gear.

The connection of the first hollow gear and of the second hollow gear by means of pins which run in grooves is particularly advantageous since in this way the rotation of the first hollow gear relative to the second hollow gear can be controlled in a selective fashion. That is to say the rotation of the second hollow gear is dependent on the position of the first hollow gear. By means of the grooves in the second hollow gear in which the pins which are permanently connected to the first hollow gear run, it is possible to determine precisely when the shifting of the freewheel unit can take place or is to take place, specifically as soon as the output unit of the crank-CVT transmission is load-free.

The second hollow gear of the second mechanism and the third hollow gear of the second mechanism are preferably connected to one another by means of at least one indent connection.

The indent connection has the advantage of preventing rotation of the second hollow gear with respect to the first hollow gear during the shifting process of the freewheels and of therefore permitting smooth shifting. As a result, the second hollow gear and the third hollow gear are not permanently connected to one another but rather coupled to one another only during the shifting process of the freewheel device.

The shifting unit preferably corresponds to a spindle or to a spindle unit which is composed of a plurality of spindle rods which can in turn be displaced in the axial direction of the output shaft. The freewheel device is shifted by means of the axial displacement. For this purpose, the spindle unit has chamfers or notches in the radial direction on its circumference.

A large number of freewheels can advantageously be shifted by means of a spindle unit which is configured so as to be displaceable in the axial direction of the output shaft.

The freewheel device is preferably embodied as a shiftable freewheel which optionally blocks a relative rotation in a first or second direction of relative rotation between the freewheel device and the output shaft, and enables relative rotation between the freewheel device and the output shaft in the other of the first or second directions of relative rotation.

Shiftable freewheels have the advantage of having a compact and therefore stable design, and of therefore being particularly resistant to wear and able to cope with loading in an enduring fashion.

BRIEF DESCRIPTION OF THE DRAWINGS

The invention is described below on the basis of the appended figures, in which.

DETAILED DESCRIPTION OF THE INVENTION

The figures show an embodiment of a crank-CVT transmission according to the invention.

Figure 1:
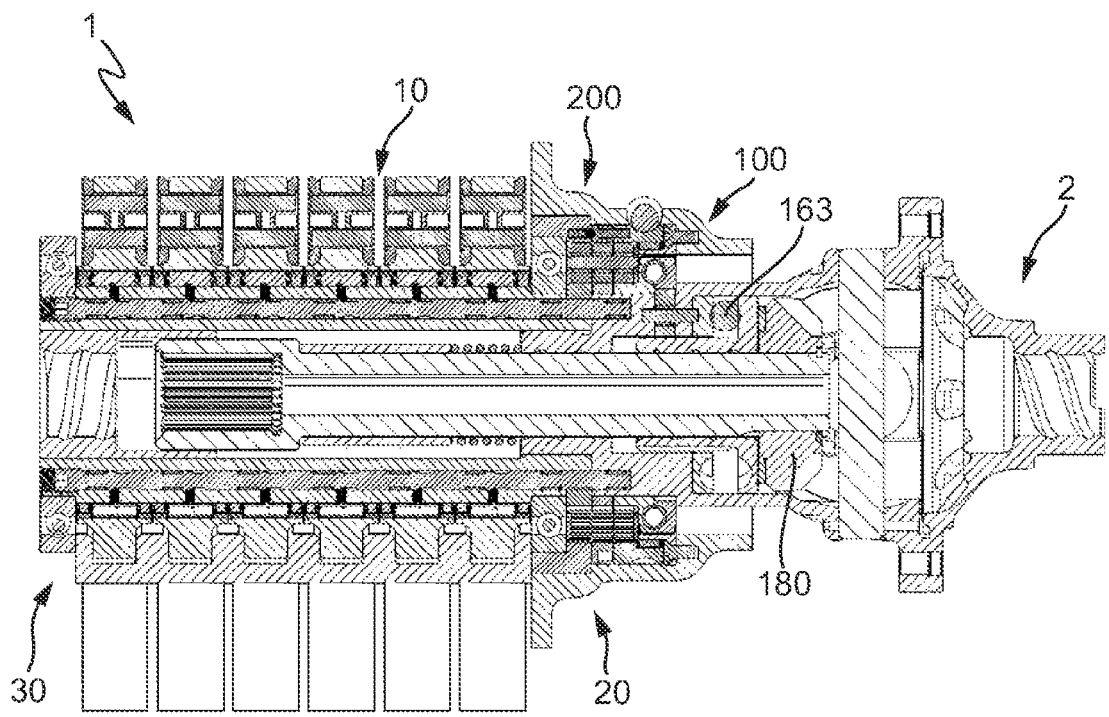
FIG. 1 shows a cross-sectional view in the axial direction of an output unit of a crank-CVT transmission according to the present invention with an actuator and a meshed bevel gear between a Cardan shaft of the transmission and a differential.
Figure 2:
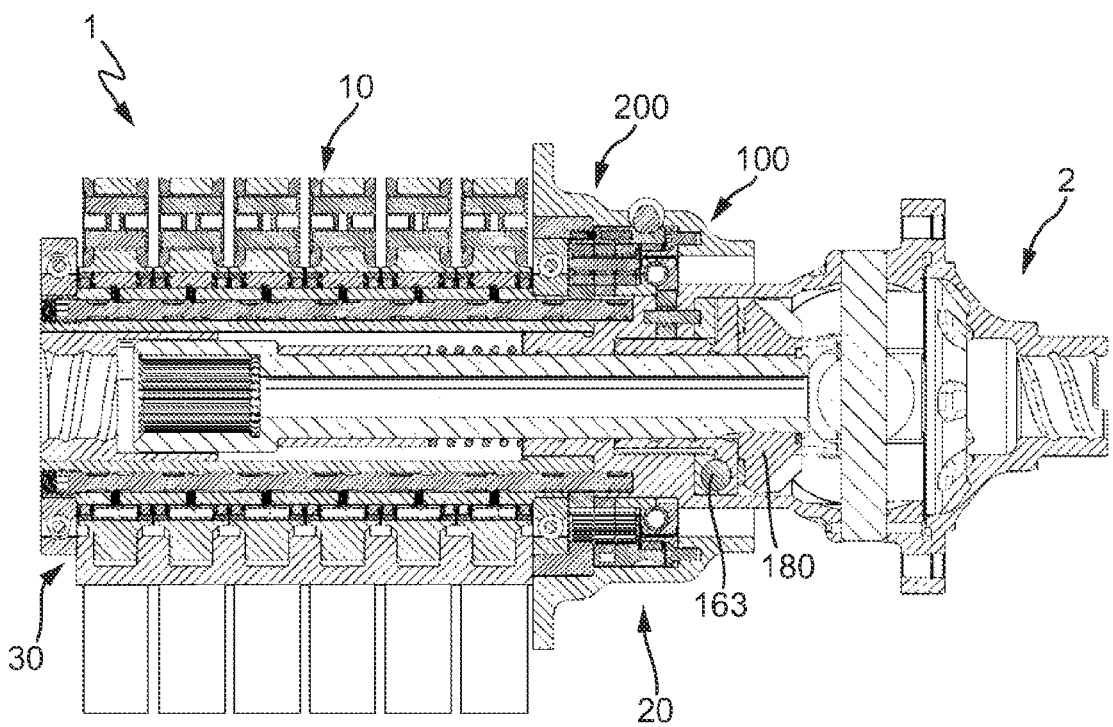
FIG. 2 shows a cross-sectional view of the drive unit of a crank-CVT transmission with an actuator and a de-meshed bevel gear.

FIGS. 1 and 2 show, in particular, an output unit 1 of a crank-CVT transmission. A freewheel device 10 is provided in the form of a plurality of freewheels which are arranged successively in the axial direction and have the purpose of connecting to the drive side of the transmission (not illustrated). The freewheels which for this purpose have, for example, articulation points for connecting-rod-like connecting elements connecting to the eccentric units of the drive side. The freewheels are provided on an output shaft 500 of the transmission. Provided in the axial direction in the output shaft 500 are bores in each of which a spindle unit 30 is respectively accommodated in an axially displaceable fashion. In this context, the spindle unit 30 includes a plurality of spindle rods 300 and serves as a shifting device. The output unit 1 has, in the axial direction, a first end 40 which corresponds to a connecting point for connecting to a differential 2, and a second end 50 which provides, for example, a bearing of the output shaft 500 on the housing. The freewheel device 10 is arranged at the second end 50. An actuator 20, which will be described later in detail, is provided at the first end 40.

Furthermore, a central through-bore, in which an inner shaft or Cardan shaft 400 is arranged, is arranged in the output shaft 500. The Cardan shaft 400 extends from the first end 40 as far as the second end 50 of the transmission. A bevel gear 180 is arranged on the Cardan shaft 400, at the first end 40. In the axial direction of the Cardan shaft 400, a ramp mechanism 160 is arranged following the bevel gear 180, in the direction of the second end 50. In addition, a compression spring 164 is provided which is arranged in a helical shape around the Cardan shaft 400, and which pre-loads the Cardan shaft 400 with respect to the output shaft 500 in the direction of the differential 2. The compression spring 164 is arranged following the ramp mechanism 160 in the direction of the second end 50, in the axial direction of the Cardan shaft 400.

In the sectional views shown in FIGS. 1 and 2 of the output unit 1, FIG. 1 shows a state of the crank-CVT transmission in which the output unit 1 is coupled to the differential 2, and the output unit 1 is connected to the differential 2 via the bevel gear 180. FIG. 2 shows a state of the crank-CVT transmission in which the output unit 1 is not coupled to the differential 2, and the bevel gear 180 of the output unit 1 is not connected to the differential 2. For the coupled state, the bevel gear 180 is positioned at the outermost first end 40 of the output unit 1. For the uncoupled state, the bevel gear 180 is moved back in the direction of the second end 50 of the output unit 1.

Figure 3:
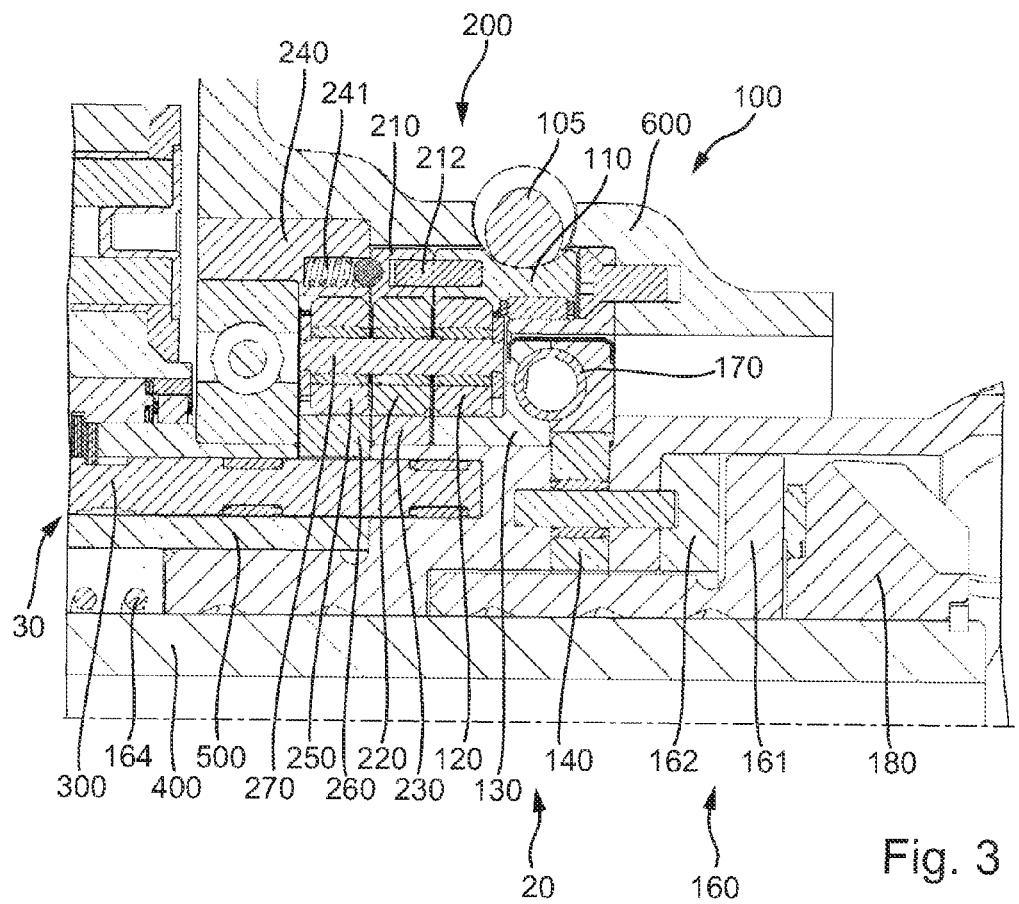
FIG. 3 shows a cross-sectional view of the actuator.

FIG. 3 shows an enlarged view of the actuator 20 from FIG. 2. The design of the actuator 20 is explained below on the basis of FIGS. 3 to 11.

The actuator 20 is arranged at the first end 40. The actuator 20 has a first mechanism 100 (on the right in FIG. 3) for the decoupling of the output unit 1 from the differential 2, and a second mechanism 200 (on the left in FIG. 3) for activating the spindle unit 30. In this context, the first mechanism 100 is arranged close to the end 40 of the output unit 1, and the second mechanism 200 is arranged behind the first mechanism 100 in the axial direction of the output unit 1, in the direction of the second end 50. The spindle unit 30 adjoins the second mechanism 200 in the axial direction and extends as far as the second end 50 of the output unit 1.

The first mechanism 100 of the actuator 20 has a first hollow gear 110, a first planetary gear set 120, which meshes with the first hollow gear 110, and a first sun gear 130 which is mounted in the output unit 1 and meshes with the first planetary gear set. Furthermore, the first mechanism 100 has a ramp mechanism 160. The ramp mechanism 160 includes a ramp planetary gear set 140 which includes three ramp planetary gearwheels, a first ramp 161, a second ramp 162 and three spherical ramp bodies 163 (see FIGS. 12 to 19) which are arranged in a guide groove with a depth between the first ramp 161 and the second ramp 162 which can be varied along the circumference. The bevel gear 180 is arranged next to the ramp mechanism 160, in the axial direction of the output unit 1 (in the direction of the first end 40). The ramp mechanism 160 also has a ramp housing 150. In addition, the first mechanism 100 has a bow spring 170, serving here to store the shifting energy, between the first sun gear 130 and the ramp mechanism 160.

In a cutout in a transmission housing 600, a worm drive 105 is arranged which engages on an outer circumference of the first hollow gear 110 that is positioned underneath the cutout in the transmission housing 600.

The second mechanism 200 is arranged following the first mechanism 100 in the axial direction of the output unit 1 (in the direction of the second end 50). The second mechanism 200 includes a second hollow gear 210, a second planetary gear set 220 and a second sun gear 230. The second sun gear 230 is permanently connected to the ramp housing 150. The second mechanism 200 also has a third hollow gear 240, a third planetary gear set 250 and a third sun gear 260, which is mounted in the output unit 1. Here, the third hollow gear 240, the third planetary gear set 250 and the third sun gear 260 are arranged, behind the respective second hollow gear 210, the second planetary gear set 220 and the second sun gear 230 in the axial direction of the output unit 1 (in the direction of the second end 50). The third sun gear 260 meshes with the spindle rods 300 of the spindle unit 30. A ramp housing 150 is arranged in the region of the actuator 20, between the Cardan shaft 400 and the output shaft 500.

Figure 10:
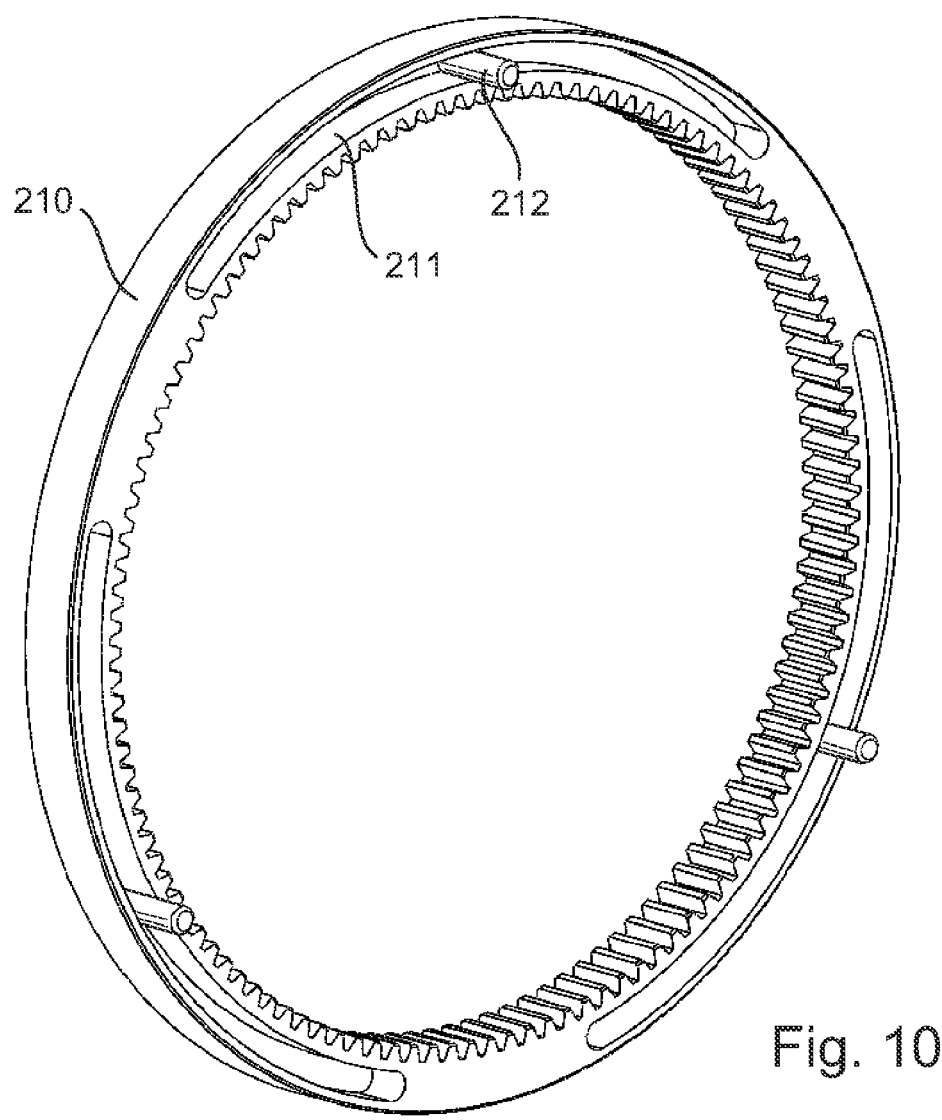
FIG. 10 shows a perspective view of the second hollow gear.
Figure 11:
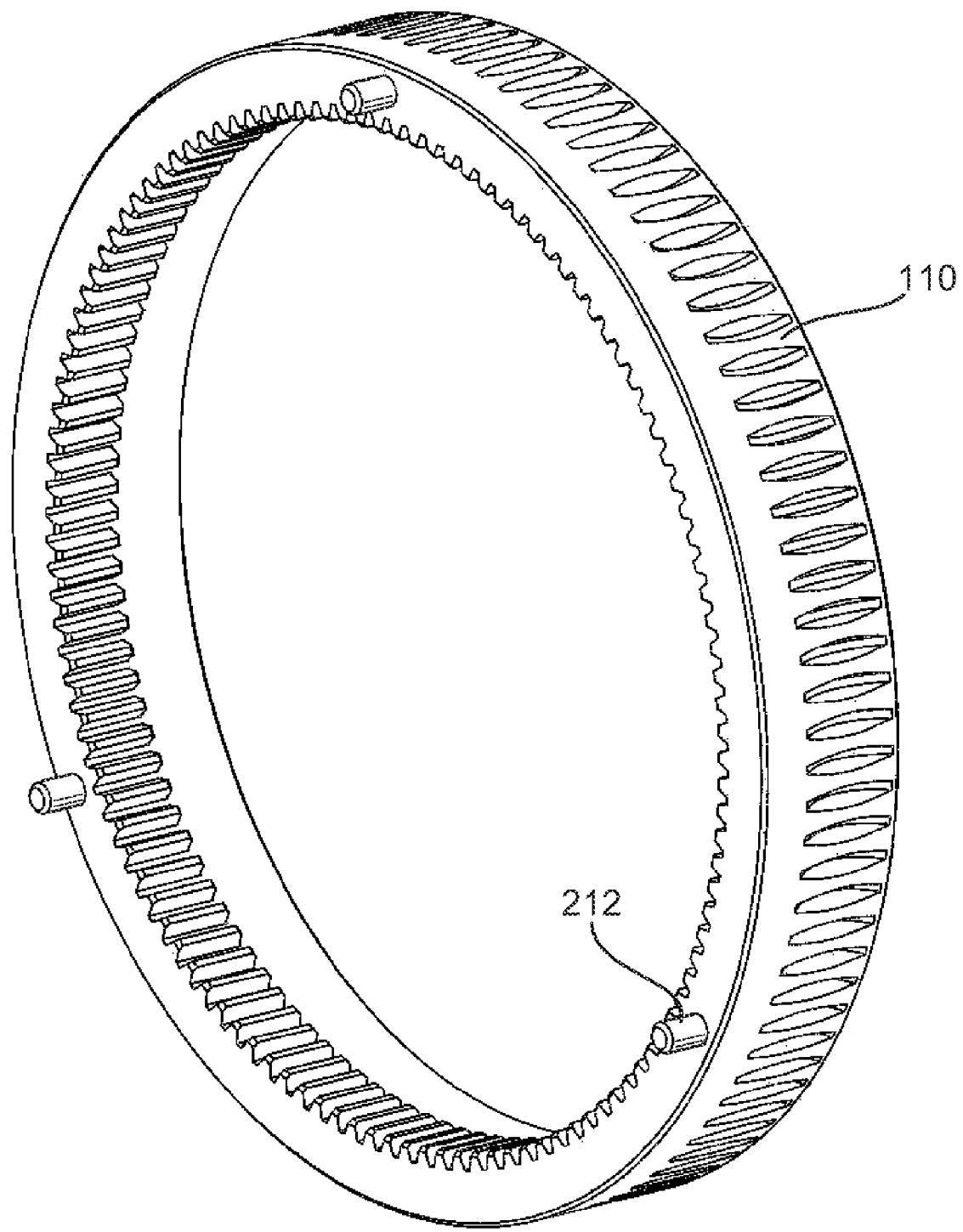
FIG. 11 shows a perspective view of the first hollow gear.

The first hollow gear 110 is connected to the second hollow gear 210 by means of three pins 212 which are permanently attached to the end face of the first hollow gear 110 and run in the grooves 211 in the end face of the second hollow gear 220 (see FIGS. 10 and 11). The second hollow gear 210 is connected to the third hollow gear 240, which is fixedly arranged in the transmission housing 600, by means of an indent connection 241 which contains essentially a helical spring and a ball.

The first planetary gear set 120, the second planetary gear set 220 and the third planetary gear set 250 have a common planetary gear carrier 270 and each include three planetary gears.

Individual parts of the crank-CVT transmission are shown in a perspective view in FIGS. 4 to 11.

Figure 4:
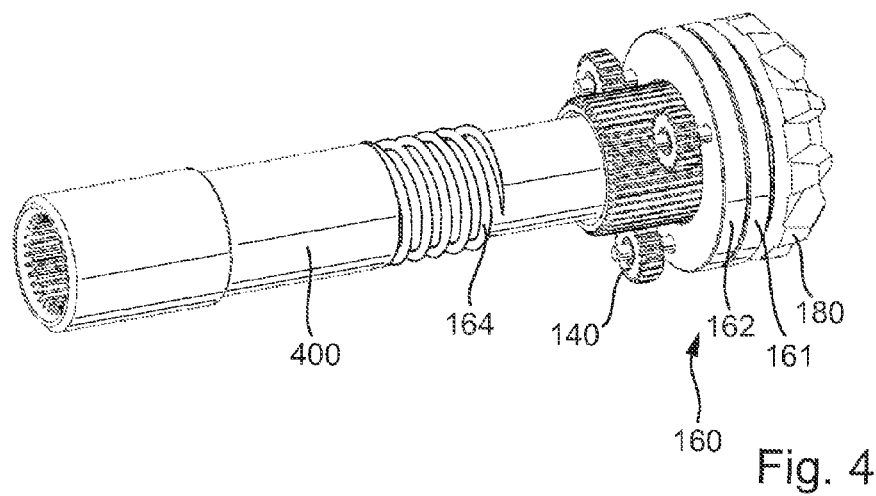
FIG. 4 shows a perspective view of the Cardan shaft with a compression spring, a ramp mechanism and a bevel gear.
Figure 5:
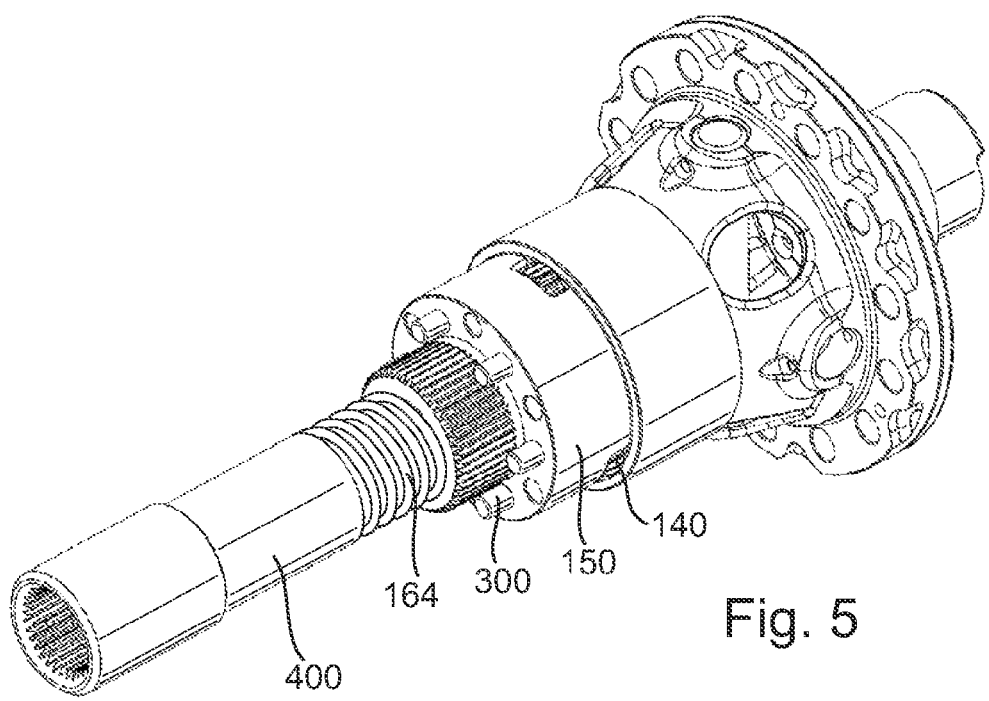
FIG. 5 shows a perspective view of the Cardan shaft with the compression spring, a spindle and a ramp housing.
Figure 6:
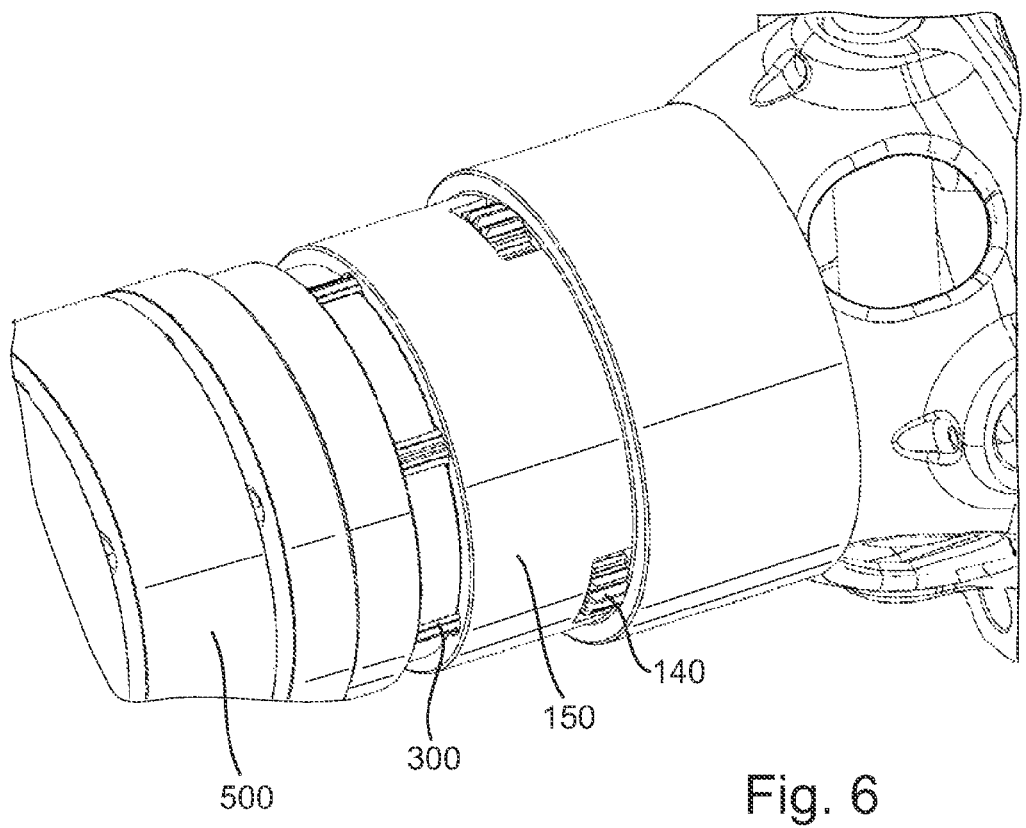
FIG. 6 shows a perspective view of the output shaft with the spindle and the ramp housing.

FIGS. 4 and 5 show perspective views of the Cardan shaft 400 on which the compression spring 164 is arranged in a helical shape.

In this context, FIG. 4 shows the bevel gear 180 which is arranged at the first end 40 of the output unit 1 on the Cardan shaft 400. The ramp mechanism 160 is arranged behind the bevel gear 180 in an axial direction of the output unit 1 (in the direction of the second end 40) on the Cardan shaft 400. In this context, the first ramp 161 has a sun gear section which serves to mesh with the ramp planetary gear set 140 of the first mechanism 100. The first ramp 161 is mounted so as to be displaceable in the axial direction of the output unit 1. The second ramp 162 is permanently connected to the output unit 1.

FIG. 5 shows the ramp housing 150 which comprises the bevel gear 180 and the ramp mechanism 160. The ramp planetary gear set 140 penetrates, with the three ramp planetary gearwheels, the ramp housing 150 at three cutouts provided for this purpose in the ramp housing 150.

Figure 7:
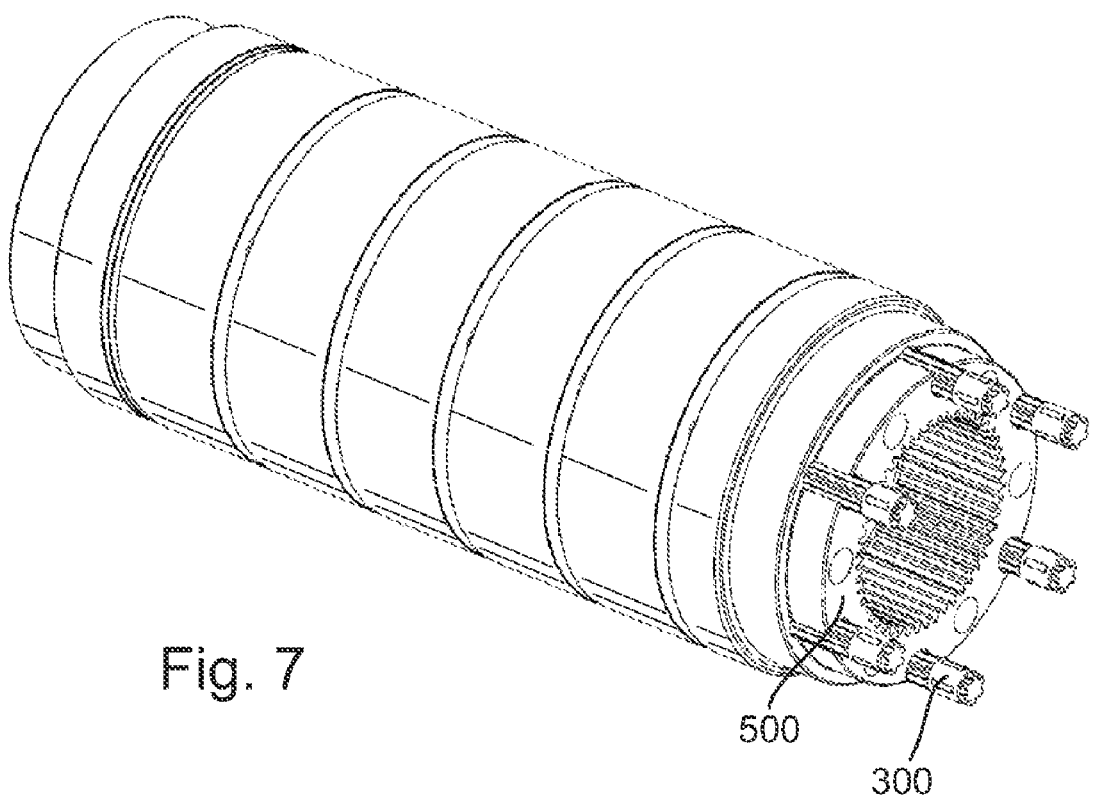
FIG. 7 shows a perspective view of the output shaft with the spindle.

FIGS. 6 to 9 show the output shaft 500, the spindle unit 30 and the ramp housing 150 with the cutouts for the three ramp planetary gearwheels of the ramp planetary gear set 140. The spindle unit 30 has six separate axially displaceable spindle rods 300 which are mounted in the output shaft 500 (FIG. 7).

Figure 8:
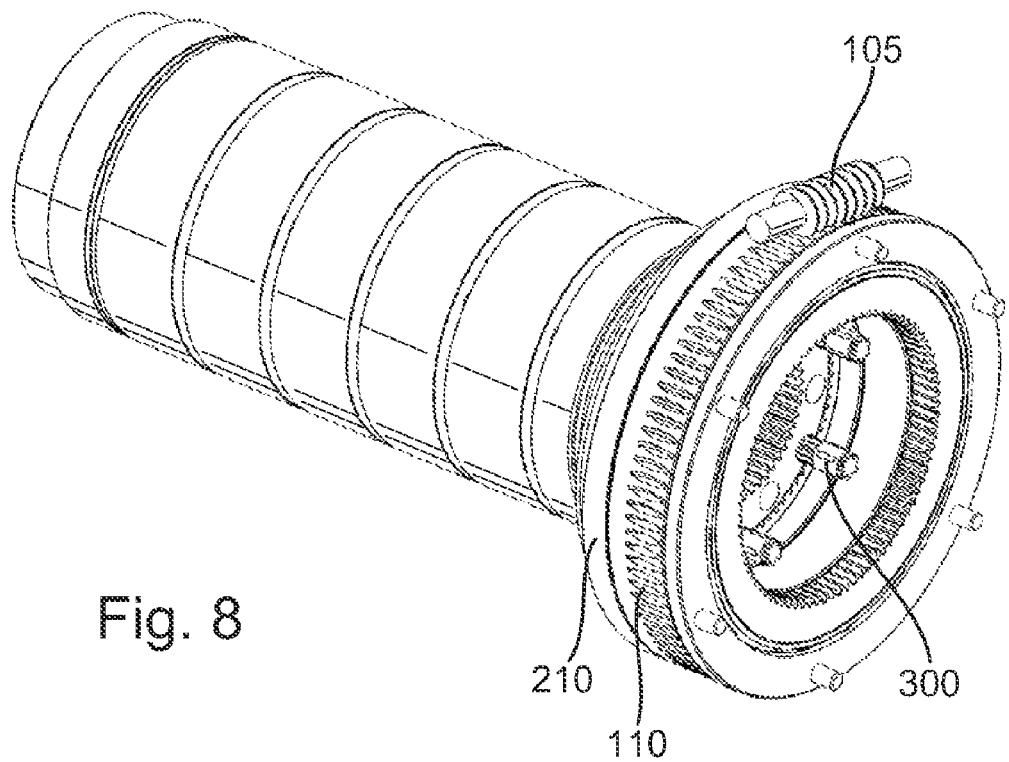
FIG. 8 shows a perspective view of the output shaft with a first hollow gear, a worm drive and a second hollow gear.

FIG. 8 shows the first hollow gear 110 as well as the worm drive 105, which acts on an outer circumference of the hollow gear 110. The first hollow gear 110 is adapted in such a way that the worm drive 105 can act on the outer circumference of the first hollow gear 110. This means that the first hollow gear 110 has, on its outer circumference, a correspondingly formed groove profile for the engagement of the worm drive 105.

Figure 9:
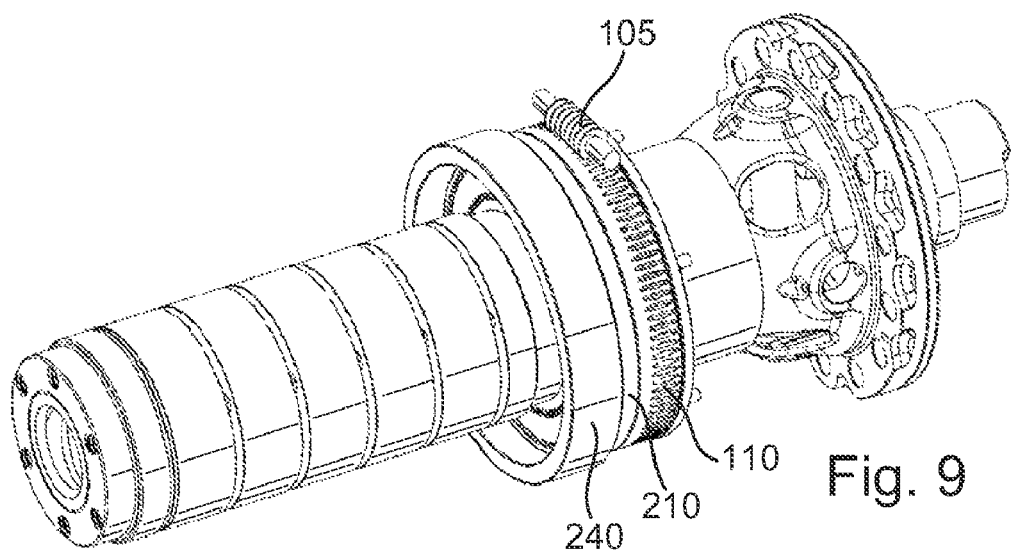
FIG. 9 shows a perspective view of the output shaft with the first hollow gear, the worm drive, the second hollow gear and a third hollow gear.

FIG. 9 shows the first hollow gear 110, the second hollow gear 210 and the third hollow gear 240 which are arranged one behind the other in the axial direction of the output unit 1 radially around the output shaft. The first hollow gear 110 is arranged near to the first end 40 of the output unit 1, and the second hollow gear 210 and the third hollow gear 240 are arranged behind the first hollow gear 110 in the direction of the second end 50.

FIG. 10 shows a perspective view of the second hollow gear 210. On the side facing the first end 40 of the drive unit 1, three arcuate grooves 211 are arranged near to the circumference of the second hollow gear 210. In each of the three grooves 211, a pin 212 is arranged in a displaceable fashion.

FIG. 11 shows the first hollow gear 110 and three pins 212 which are arranged uniformly on the side of the first hollow gear 100 facing the second end 50, near to the circumference of the first hollow gear 110. The pins 212, which are displaceable in the grooves 211 (FIG. 10), are permanently connected to the first hollow gear 110.

A plan view of the second ramp 162 is shown in FIGS. 12 to 19.

The second ramp 162 has, on a side or face which faces or is assigned to the first end 40 of the output unit 1, three arcuate ramp regions 165 which are distributed uniformly in the circumferential direction. Each of the three arcuate ramp regions 165 contains two first ramp sections 166, two second ramp sections 167 and two third ramp sections 168. The two third ramp sections 168 bear one next to the other. On the outside, the two second ramp sections 167 adjoin the two third ramp sections 168, and the two first ramp sections 166 adjoin the two second ramp sections 167, with the result that, in a plan view onto the ramp 162, the two first ramp sections 166, the two second ramp sections 167 and the two third ramp sections 168 are each symmetrical with respect to an axis of symmetry which separates the first ramp section 166 from one another.

The first ramp sections 166 and the third ramp sections 168 are without a gradient along the ramp 162 and therefore have ramp faces which are each perpendicular to the axial direction of the output unit 1. However, the first ramp faces 166 and the third ramp faces 168 are located in different planes from one another, perpendicularly with respect to the axial direction. The second ramp sections 167 connect the first ramp sections 166 to the third ramp sections 168 and have ramp faces which drop away. The first ramp sections 166 are therefore proud to the greatest degree, or recessed to the least degree, with respect to the ramp 162 in the axial direction of the output unit 1 (in the direction of the first end 40), while the third ramp sections 168 are countersunk to the greatest extent into the ramp 162 in the axial direction of the output unit 1 (in the direction of the second end 50).

The method of functioning of the shifting mechanism and of the actuator will be described below:

FIGS. 12 to 19 show, by means of plan views onto the second hollow gear 210 and onto the second ramp 162, various shifting phases of the actuator 20. The shifting phases are dependent on the position of the three pins 212 in the three grooves 211 of the second hollow gear 210 and on the position of the three conical ramp bodies 163 in the second ramp 162.

Figure 12:
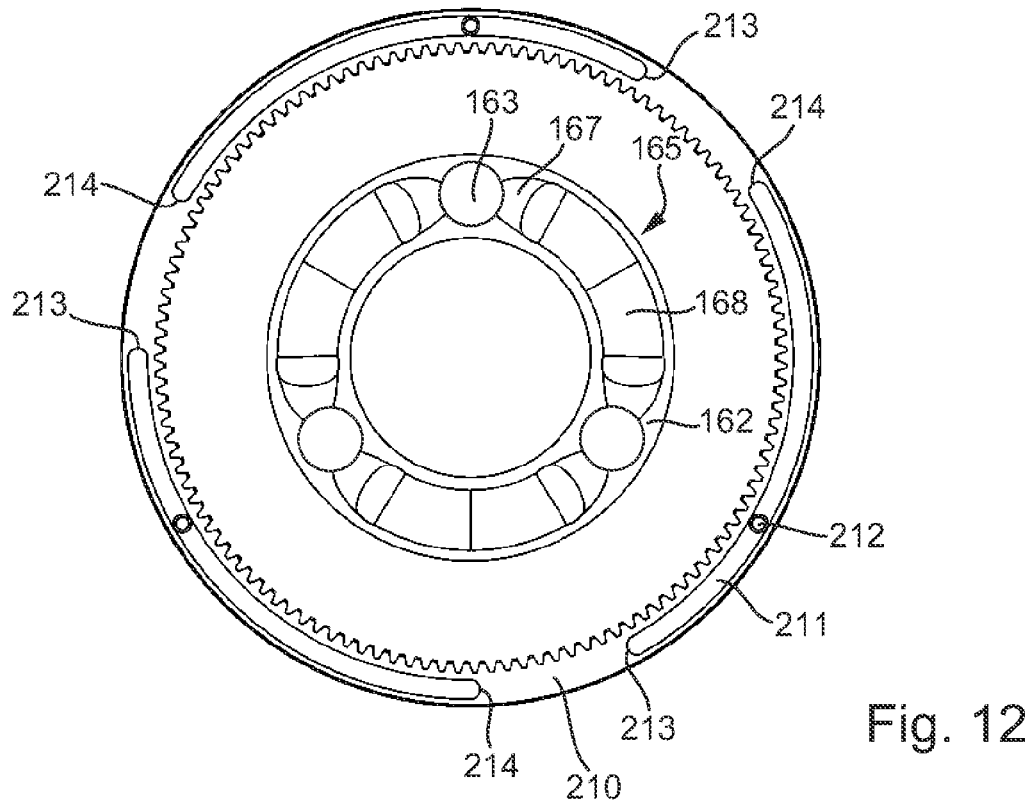
FIG. 12 shows a plan view of the second hollow gear and the ramp mechanism in a first shifting phase.

In FIG. 12, the three pins 212 are located in the three grooves 211 between the first groove end point 213 and the second groove end point 214 of the grooves 211. The three conical ramp bodies 163 are each positioned on the first ramp sections 166. This means that FIG. 12 shows the first shifting phase of the actuator 20. In the first shifting phase, the output unit 1 of the crank-CVT transmission is connected to the differential 2, that is to say the bevel gear 180 is coupled to the differential 2, and the freewheel device 10 of the output unit 1 permits a rotational movement of the output unit 1 in a first direction of rotation. The conical ramp bodies 163 are arranged on the first ramp sections 166 here, and the pins 212 are located here in the grooves 211 at a position between the first groove end points 213 and the second groove end points 214.

In order to drive the shifting mechanism 20 of the freewheels, the worm drive 105 begins (not illustrated) to drive the first hollow gear 110 (not illustrated). In this context, the second hollow gear 210 initially does not rotate. The pins 212 which are permanently connected to the first hollow gear 110 run in the grooves 211 of the second hollow gear 210 in a first direction of rotation. The conical ramp bodies 163, which are located in the first ramp sections 166 in FIG. 12, move as a result of the rotations of the first ramp 161 (not illustrated) in the first direction of rotation along the ramp regions 165, also in the first direction of rotation, which is shown in FIG. 13.

Figure 13:
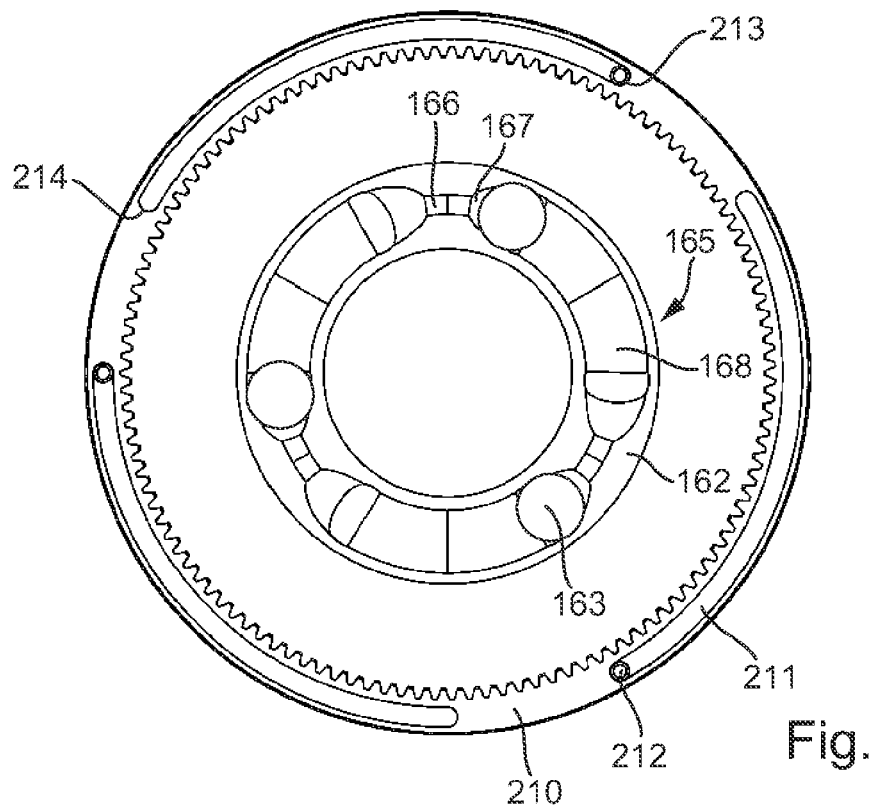
FIG. 13 shows a plan view of the second hollow gear and the ramp mechanism in a second shifting phase.

In FIG. 13, the three pins 212 are each located at a first groove end point 213 of the respective groove 211. The three conical ramp bodies 163 are each positioned on the second ramp sections 167 which correspond to a movement of the conical ramp bodies 163 in a first direction of rotation. This means that FIG. 13 shows the second shifting phase. In the second shifting phase, the output unit 1 of the crank-CVT transmission is no longer connected to the differential 2, that is to say the bevel gear 180 is decoupled from the differential 2. For this purpose, the spherical ramp bodies 163 are located in the second ramp section 167 which drops away from the first ramp section 166 in the direction of the third ramp section, and they therefore press the ramps 161, 162 apart, which leads to a relative displacement of the Cardan shaft 400 with respect to the output shaft 500. The pins 212 abut against the first groove end points 213 with the second hollow gear 210.

Since the first hollow gear 110 still rotates in a first direction of rotation, the second hollow gear 210 is entrained in the first direction of rotation by the first hollow gear 110 starting from the moment at which the pins 212 abut against the first groove end points 213. The spherical ramp bodies 163 likewise move further in the first direction of rotation, which is shown in FIG. 14.

Figure 14:
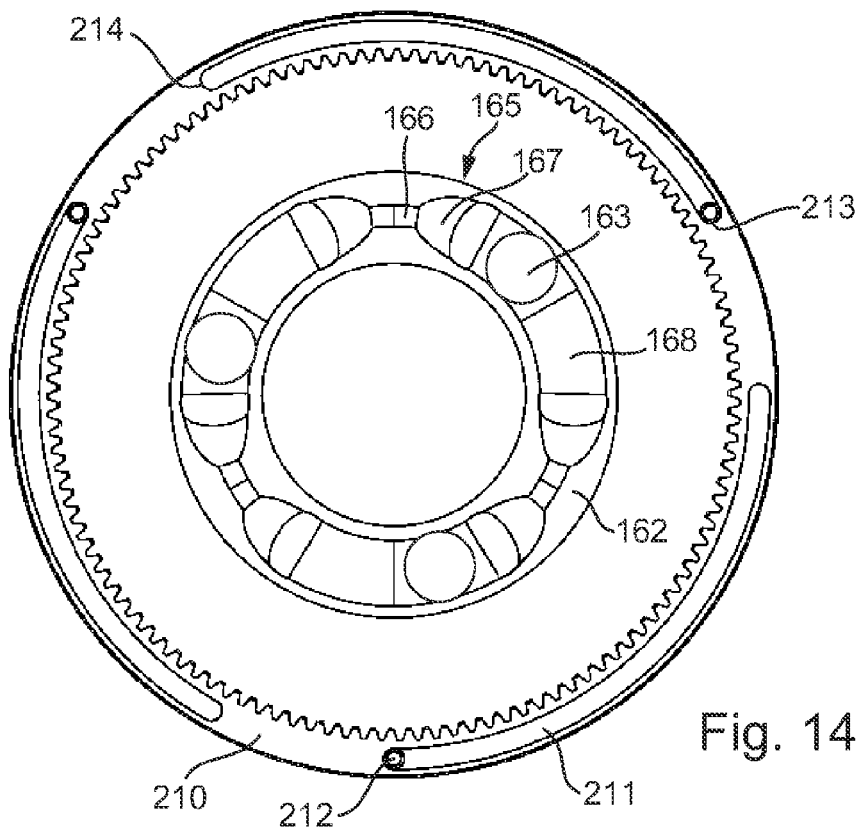
FIG. 14 shows a plan view of the second hollow gear and the ramp mechanism in a third shifting phase.

In FIG. 14, the three pins 212 are each located at the first groove end points 213 of the respective grooves 211. The three spherical ramp bodies 163 are each positioned on the third ramp sections 168, which correspond to a movement of the spherical ramp bodies 163 in a first direction of rotation. This means that FIG. 14 shows the third shifting phase. In the third shifting phase, the output unit 1 of the crank-CVT transmission is likewise not connected to the differential 2, that is to say the bevel gear 180 is still decoupled from the differential 2. Pins 212 are located at the first groove end points 213, and the spherical ramp bodies 163 are arranged in the third ramp section 168.

The second hollow gear 210 therefore rotates, via the second planetary gear set 220 and the planetary gear carrier 270, the third planetary gear set and the third sun gear 260 which drives the spindle unit 30, thereby shifting the freewheel device 10 from the first direction of rotation to the second direction of rotation. The shifting of the freewheel device 10 from the first direction of rotation into a second direction of rotation therefore takes place in the third shifting phase.

In order to avoid rotation of the second hollow gear 210 with respect to the third hollow gear 250 during the shifting of the freewheel unit 10, the second hollow gear 210 is held in position relative to the third hollow gear 250 by means of the indent connection 241 during the shifting process. Since the shifting process is past, the indent connection 241 and the second hollow gear 210 can rotate again with respect to the third hollow gear 250, which is shown in FIG. 15.

The shifting of the freewheel device 10 from a first direction of rotation into a second direction of rotation causes all the rotating components of the output unit 1 to move in a second direction of rotation.

Figure 15:
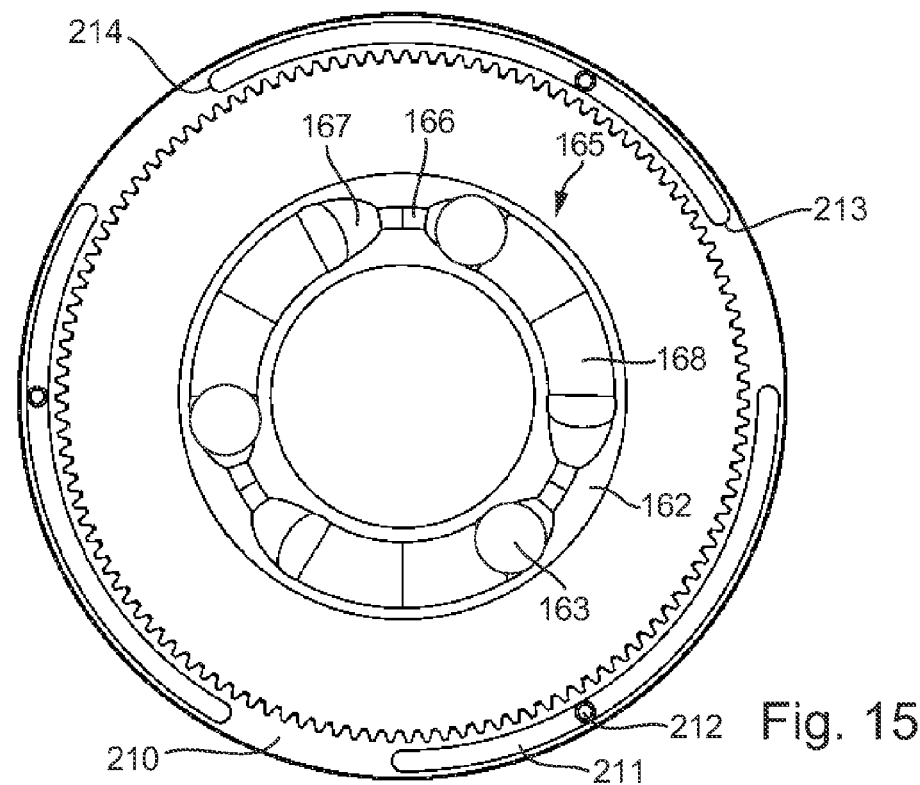
FIG. 15 shows a plan view of the second hollow gear and the ramp mechanism in a fourth shifting phase.

In FIG. 15, the three pins 212 are located between the respective first groove end points 213 and the respective second groove end points 214 of the grooves 211. The three spherical ramp bodies 163 are each positioned on the second ramp sections 167 which correspond to a movement of the spherical ramp bodies 163 in a second direction of rotation. This means that FIG. 15 shows the fourth shifting phase. The output unit 1 of the crank-CVT transmission is not connected to the differential 2 in the fourth shifting phase either, that is to say the bevel gear 180 is decoupled from the differential 2. The three pins 212 are arranged in the grooves 211, in each at a position between the first groove end points 213 and the second groove end points 214. The spherical ramp bodies 163 are located on the second ramp sections 167.

Figure 16:
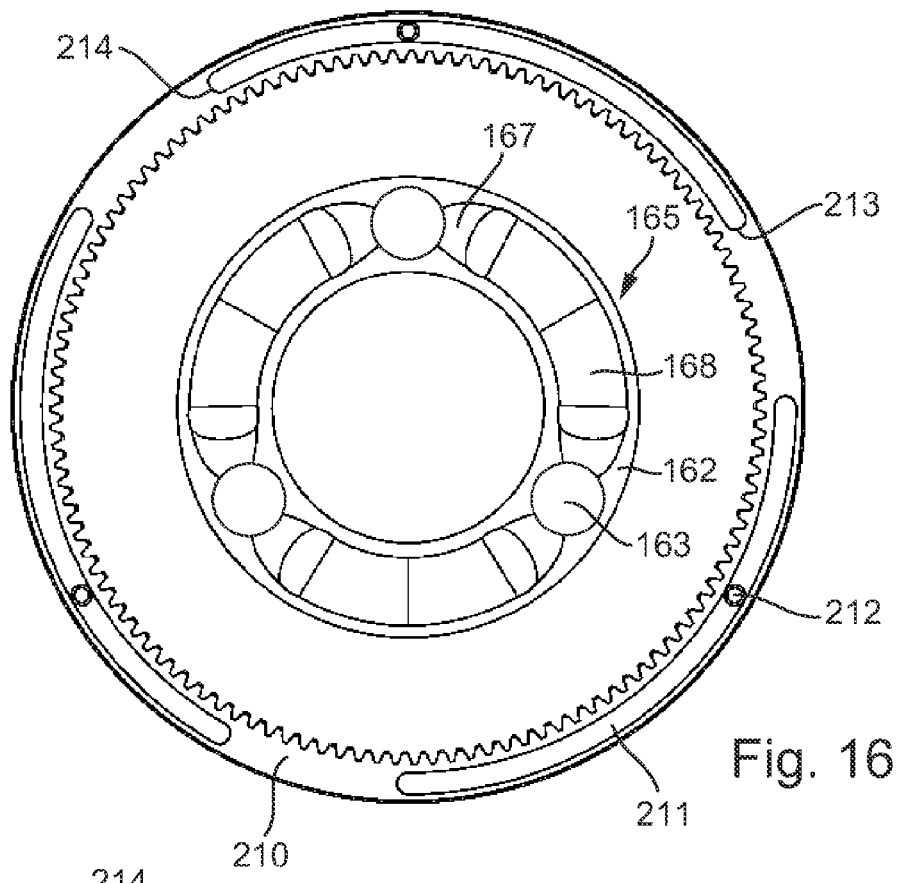
FIG. 16 shows a plan view of the second hollow gear and the ramp mechanism in a fifth shifting phase.

The pins 212 move in the grooves 211 from the first groove end points 213 in the direction of the second groove end points 14 in the second direction of rotation. The second hollow gear 210 therefore does not rotate. The spherical ramp bodies 163 move in the second direction of rotation, which is shown in FIG. 16.

Figure 17:
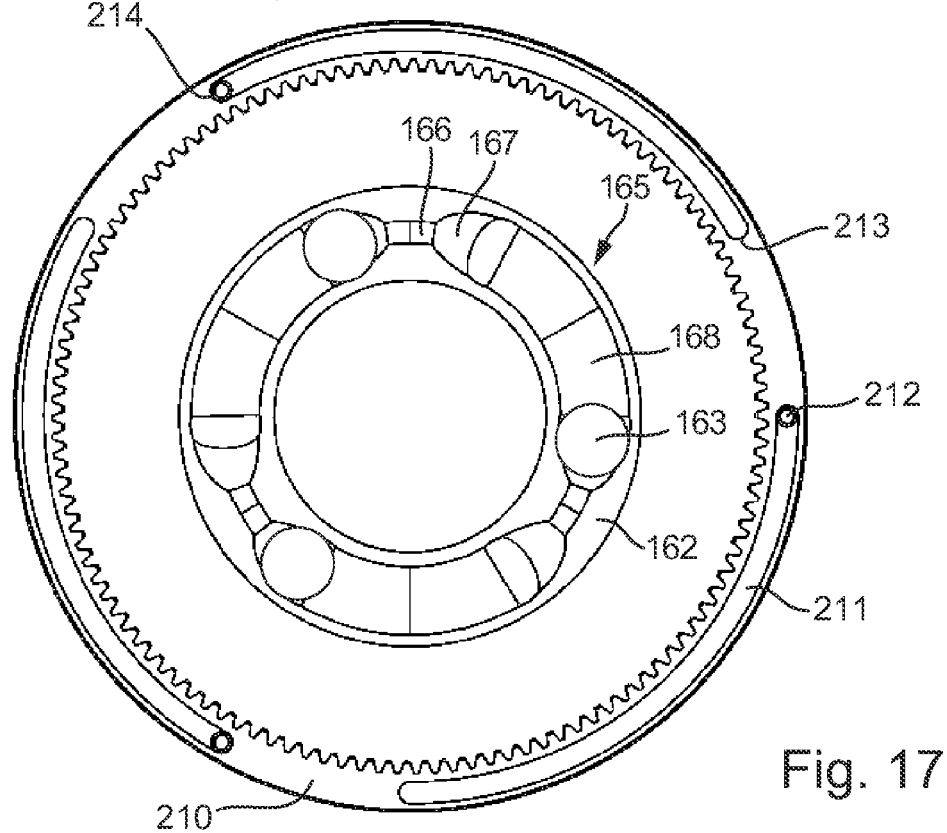
FIG. 17 shows a plan view of the second hollow gear and the ramp mechanism in a sixth shifting phase.

In FIG. 17, the three pins 212 are each positioned at the respective second groove end points 214 of the grooves 211. The three spherical ramp bodies 163 are each positioned on the first ramp sections 166. This means that FIG. 17 shows the fifth shifting phase. In the fifth shifting phase, the output unit 1 of the crank-CVT transmission is again connected to the differential 2, that is to say the bevel gear 180 is again coupled to the differential 2 in order to transmit the second direction of rotation of the output unit 1 to the differential 2.

In this context, the spherical ramp bodies 163 move on in the second direction of rotation and in the fifth shifting phase they are again located on the first ramp sections 166. The pins 212 still run in the second direction of rotation in the grooves 211 between the first groove end points 213 and the second groove end points, and the second hollow gear 210 therefore does not move.

As soon as renewed shifting of the freewheel device 10 is to be carried out for a reversal of the direction of rotation, the decoupling of the output unit 1 from the differential 2 takes place again in order to permit load-free shifting of the freewheel device 10. This can be seen in FIG. 17.

In FIG. 17, the three pins 212 are each located at the second groove end points 214 of the grooves 211. The three spherical ramp bodies 163 are each positioned on the second ramp sections 167 which correspond to a movement of the spherical ramp bodies 163 in a second direction of rotation. This means that FIG. 17 shows the sixth shifting phase. In the sixth shifting phase, the output unit 1 of the crank-CVT transmission is no longer connected to the differential 2, that is to say the bevel gear 180 is decoupled from the differential and the output unit is load-free.

Since the output unit 1 still rotates in the second direction of rotation, the spherical ramp bodies 163 firstly also move in the second direction of rotation. The pins 212 move in the grooves 211 in a second direction of rotation and therefore abut against the second groove end points 214. Starting from this time, the second hollow gear 210 is again entrained by the first hollow gear 110 and moves in the second direction of rotation, which is shown in FIG. 18.

Figure 18:
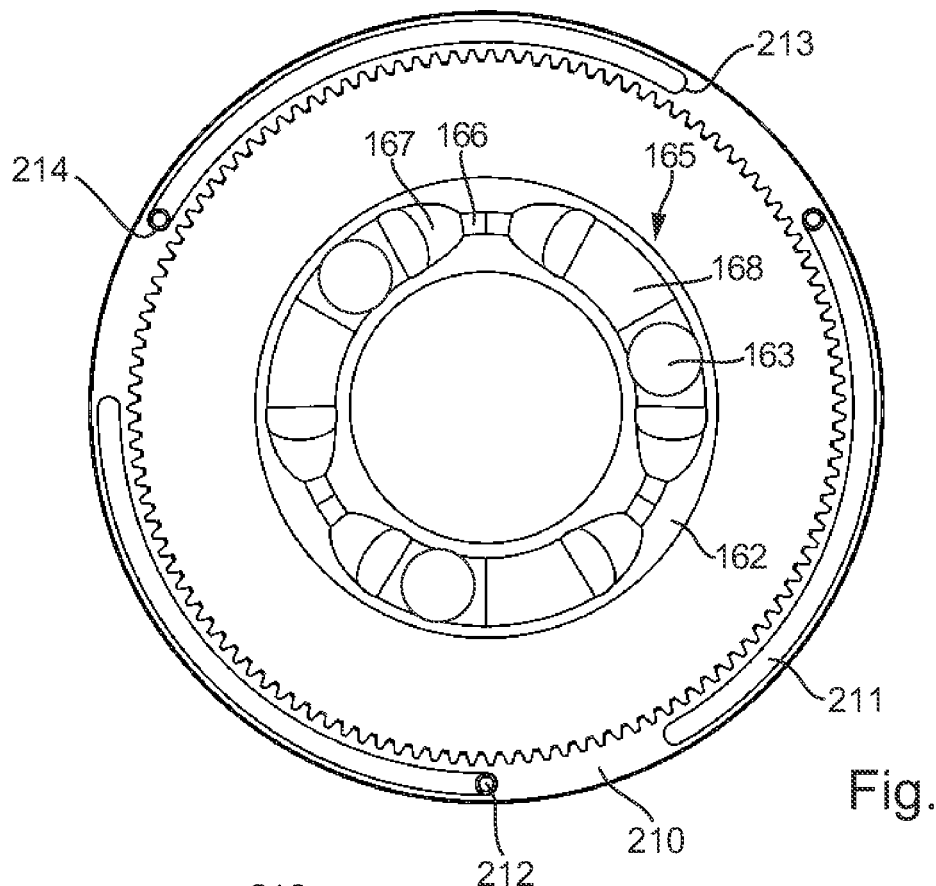
FIG. 18 shows a plan view of the second hollow gear and the ramp mechanism in a seventh shifting phase.

In FIG. 18, the three pins 212 are located between the respective groove end points 213 and the respective second groove end points 214 of the grooves 211. The three spherical ramp bodies 163 are each positioned on the third ramp sections 168, which correspond to a movement of the spherical ramp bodies 163 in a second direction of rotation. This means that FIG. 18 shows the seventh shifting phase. In the seventh shifting phase, the output unit of the crank-CVT transmission 1 is, furthermore, not connected to the differential 2, that is to say the bevel gear 180 continues to be decoupled from the differential. The pins 212 continue to be located at the groove end points 214, and the spherical ramp bodies 163 on the third ramp sections 168.

As a result of the connection of the first hollow gear 110 (not illustrated) to the second hollow gear 210 via the pins 212 which are located at the groove end points 214, the second hollow gear 210 is entrained further in the second direction of rotation. The second hollow gear therefore rotates, via the second planetary gear set 220 and the planetary gear carrier 270, the third planetary gear set and the third sun gear 260 which drives the spindle 300 in order to shift the freewheel device 10 from the second direction of rotation to the first direction of rotation, which is shown in FIG. 19.

The second hollow gear 210 therefore rotates via the second planetary gear set 220 and the planetary gear carrier 270 the third planetary gear set and the third sun gear 260 which drives the spindle unit 30 and therefore shifts the freewheel device 10 from the second direction of rotation to the first direction of rotation. As a result, the freewheel device 10 shifts from the second direction of rotation into a first direction of rotation, that in the seventh shifting phase.

Figure 19:
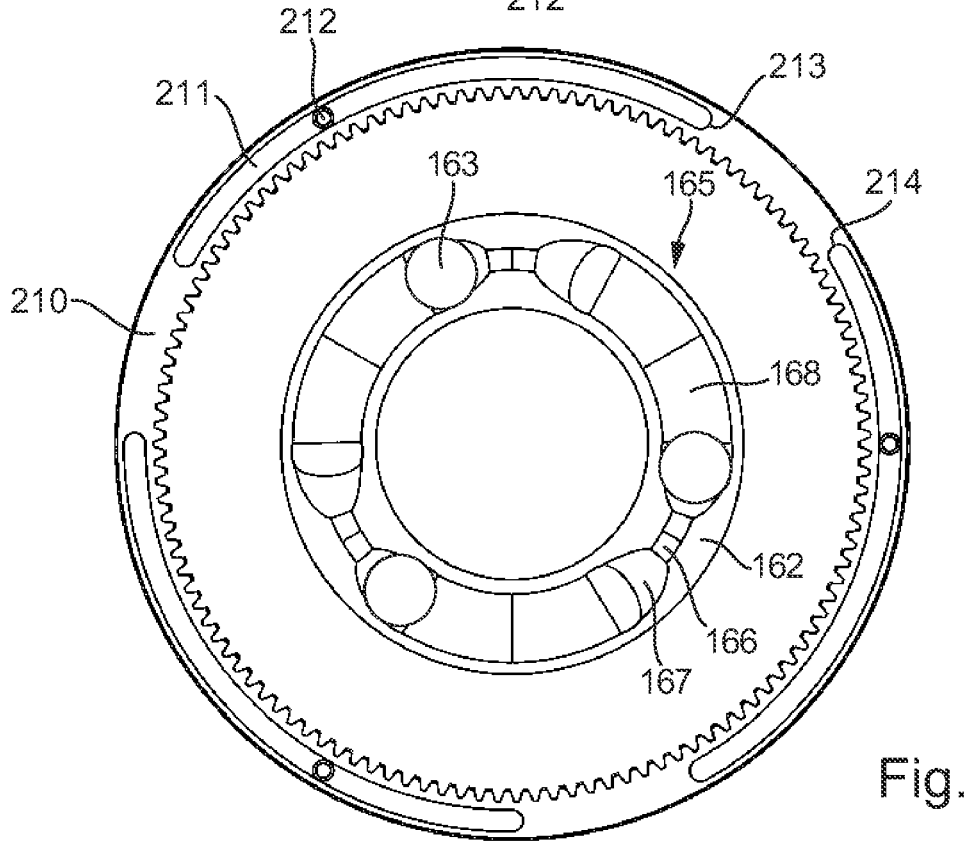
FIG. 19 shows a plan view of the second hollow gear and the ramp mechanism in an eighth shifting phase.

In FIG. 19, the three pins 212 are located between the respective first groove end points 213 and the respective second groove end points 214 of the grooves 211. The three spherical ramp bodies 163 are each positioned on the second ramp sections 167 which correspond to a movement of the spherical ramp bodies 163 in a first direction of rotation. This means that FIG. 19 shows the eighth shifting phase. In the eighth shifting phase, the output unit of the crank-CVT transmission 1 is furthermore not connected to the differential 2, that is to say the bevel gear 180 is still decoupled from the differential.

The pins 212 move again in a first direction of rotation and are located in the grooves 211 at positions between the first groove end positions 213 and the second groove end positions 214. The spherical ramp bodies 163 likewise move in the first direction of rotation and are arranged on the second ramp sections 167.

The ninth shifting phase corresponds to the first shifting phase which is shown in FIG. 12. In the first shifting phase, the output unit 1 of the crank-CVT transmission is again connected to the differential 2, that is to say the bevel gear 180 is coupled to the differential 2, and the freewheel device 10 of the output unit 1 permits rotation of the rotating components of the output unit 1 in the first direction of rotation. In this context, the spherical ramp bodies 163 are arranged on the first ramp sections 166, and the pins 212 are located in the grooves 211 at a position between the first groove end points 213 and the second groove end points 214.

During operation of the crank-CVT transmission 1, the first mechanism 100 is firstly activated in order to shift the freewheel device 10. For this purpose, the worm drive 105 drives the first hollow gear 110. The first hollow gear 110 in turn drives the first planetary gear set 120, which meshes with the first sun gear 130 and drives the first sun gear 130. The first sun gear 130 meshes with the ramp planetary gear set 140, which engages in the sun gear section of the first ramp 161, and therefore drives the first ramp 161 of the ramp mechanism 160. Through the rotation of the first ramp 161, the three spherical ramp bodies 163 migrate along the ramp region 165 between the first ramp 161 and the second ramp 162, and they move the first ramp 161 in the axial direction of the output unit, in the direction of the first end 40 of the output unit 1 counter to the pre-loading of the spring 164.

The second ramp 162 cannot be displaced in the axial direction of the output unit. Depending on the direction of rotation of the first ramp 161, the spherical ramp bodies 163 move in a first direction of rotation or a second direction of rotation and accordingly into ramp regions 165 which correspond to the first direction of rotation or the second direction of rotation.

If the spherical ramp bodies 163 are located on the respective first ramp sections 166 of the ramp regions 165, the first ramp 161 is displaced in the direction of the first end 40 over a maximum possible distance in the axial direction of the drive unit 1. In this state, the bevel gear 180 of the output unit 1 is connected or coupled to the differential 2, and torque is therefore transmitted from the output unit 1 to the differential 2.

If the spherical ramp bodies 163 are located on the third ramp sections 168 of the ramp regions 165, the first ramp 161 is displaced in the direction of the second end 50 over a maximum possible distance in the axial direction of the drive unit 1. In this state, the bevel gear 180 of the output unit 1 is not connected or coupled to the differential 2. That is to say the bevel gear 180 is decoupled from the differential 2, and torque is not transmitted from the output unit 1 to the differential 2.

While the first mechanism 100 serves to decouple or couple the bevel gear 180, the second mechanism 200 is not activated. This means that the pins 212 which connect the first hollow gear 110 of the first mechanism 100 and the second hollow gear 210 of the second mechanism 200 to one another run in the grooves 211 during the decoupling process of the bevel gear, therefore preventing the second hollow gear 210 from rotating with the first hollow gear 110 during the decoupling process of the bevel gear 180.

When the decoupling process is terminated, that is to say the bevel gear 180 is decoupled from the differential 2 and the output unit 1 is therefore load-free, the three pins 212 therefore respectively impact against the first groove end points 213 of the grooves 211. As soon as the three pins 212 have reached the first groove end points 213 of the grooves 211, the second hollow gear 210 is entrained by the first hollow gear 110 and therefore driven. Since a connection is generated between the first hollow gear 110 and the second hollow gear 210 by means of the pins 212, the first hollow gear 110 and the second hollow gear 210 rotate together in a first common direction of rotation at the same speed.

The second hollow gear 210 drives the second planetary gear set 220 which meshes with the second sun gear 230. The sun gear 230 is permanently connected to the output unit 1. The rotation of the second planetary gear set 220 therefore drives the planetary gear carrier 270.

The planetary gear carrier 270 in turn drives the third planetary gear set 250 which meshes with the third hollow gear 240, which is permanently arranged in the transmission housing 600, and with the third sun gear 260, which is connected to the spindle unit 30. The third sun gear 260 drives the spindle unit 30, which is arranged in the output shaft 500.

The spindle unit 30 can be displaced in the axial direction. As a result of the axial displacement of the spindle unit 30, the shifting of the freewheel device 10 takes place, for example by means of coil spring mechanisms in conjunction with spherical sections of the spindle unit 30.

So that the bevel gear 180 couples satisfactorily into the differential 2, a bow spring 170 is arranged between the first sun gear 130 and the ramp mechanism 160, which bow spring 170 stores energy when the freewheel device 10 shifts, and said sun gear 130 and the ramp mechanism 160 assists the coupling of the bevel gear 180 in the differential 2 if the tooth heads of the bevel gear prevent immediate coupling.

Smooth functioning of the ramp mechanism 160 is ensured by a compression spring 164 which is arranged in a helical shape around the Cardan shaft 400 and which always compresses the first ramp 161 and the second ramp 162, and is therefore under tension.

LIST OF REFERENCE NUMERALS

1 Output Unit
2 Differential
10 Freewheel Device
20 Actuator
30 Shifting Unit, Spindle Unit
100 First Mechanism
105 Drive, Worm Drive
110 First Hollow Gear
120 First Planetary Gear Set
130 First Sun Gear
140 Ramp Planetary Gear Set
160 Ramp Mechanism
150 Ramp Housing
161 First Ramp
162 Second Ramp
163 Ramp Body
164 Compression Spring
165 Ramp Region
166 First Ramp Section
167 Second Ramp Section
168 Third Ramp Section
170 Bow Spring
180 Connecting Means, Bevel Gear
200 Second Mechanism
210 Second Hollow Gear
211 Groove
212 Pin
213 First Groove End Point
214 Second Groove End Point
220 Second Planetary Gear Set
230 Second Sun Gear
240 Third Hollow Gear
241 Indent Connection
250 Third Planetary Gear Set
260 Third Sun Gear
270 Planetary Gear Carrier
300 Spindle Rod
400 Cardan Shaft
500 Output Shaft
600 Transmission Housing

The invention claimed is:

1. A crank-CVT transmission, comprising:
an output shaft;
a freewheel device connected to the output shaft, the output shaft adapted to optionally enable and block a relative rotation between the freewheel device and the output shaft;
a shifting unit adapted to shift the freewheel device;
a differential;
an inner shaft which is connectable to the output shaft and to the differential via a connecting means, the inner shaft being displaceable in an axial direction of the output shaft; and
an actuator, which interacts with the shifting unit and is adapted to initiate shifting of the freewheel device having a first mechanism adapted to displace the inner shaft in the axial direction to disconnect the inner shaft from the differential, and a second mechanism adapted to drive the shifting unit, the second mechanism being coupled to the first mechanism and being driven after the first mechanism.

2. The crank-CVT transmission as claimed in claim 1, wherein the first mechanism has a drive.

3. The crank-CVT transmission as claimed in claim 2, wherein the drive is a worm drive.

4. The crank-CVT transmission as claimed in claim 1, wherein the first mechanism has a first hollow gear, a first planetary gear set and a first sun gear.

5. The crank-CVT transmission as claimed in claim 4, Wherein the first mechanism has a ramp mechanism, and the ramp mechanism has a ramp planetary gear set, a first ramp which is permanently connected to the inner shaft, a second ramp which is permanently arranged in a ramp housing, and at least one ramp body, which is arranged between the first ramp and the second ramp.

6. The crank-CVT transmission as claimed in claim 5, wherein the first mechanism has a compression spring, which is adapted and arranged to compress the first ramp and the second ramp.

7. The crank-CVT transmission as claimed in claim 5, wherein the first mechanism has a bow spring which is arranged between the first sun gear and the ramp mechanism.

8. The crank-CVT transmission as claimed in claim 5, wherein the second mechanism has a second hollow gear, a second planetary gear set and a second sun gear.

9. The crank-CVT transmission as claimed in claim 8, wherein the second mechanism has a third hollow gear, a third planetary gear set and a third sun gear.

10. The crank-CVT transmission as claimed in claim 9, wherein the first sun gear and the third sun gear are mounted rotatably, and the second sun gear is permanently connected to the ramp housing.

11. The crank-CVT transmission as claimed in claim 9, wherein the first planetary gear set, the second planetary gear set and the third planetary gear set have a common planetary gear carrier.

12. The crank-CVT transmission as claimed in claim 9, wherein the third hollow gear has at least one indent connection adapted to permanently connect the second hollow gear to the third hollow gear.

13. The crank-CVT transmission as claimed in claim 8, wherein the second hollow gear has, on a surface assigned to the first hollow gear, at least one arcuate groove in which a pin, which is permanently connected to the first hollow gear, is arranged.

14. The crank-CVT transmission as claimed in claim 13, wherein the second hollow gear has, on a surface assigned to the first hollow gear, three grooves, and in each of the grooves a pin, which is permanently connected to the first hollow gear, is arranged.

15. The crank-CVT transmission as claimed in claim 1, wherein the shifting unit is a spindle, which is displaceable in the axial direction of the output shaft.

16. The crank-CVT transmission as claimed in claim 1 wherein the freewheel device optionally blocks a relative rotation in a first direction of relative rotation between the freewheel device and the output shaft, or in a second direction of relative rotation between the freewheel device and the output shaft, permitting a relative rotation between the freewheel device and the output shaft in another direction of relative rotation.

* * * * *